United States Patent
Sung (10) Patent No.: US 11,629,973 B2
(45) Date of Patent: Apr. 18, 2023

(54) SYSTEM AND METHOD FOR CONTROLLING DRIVING LANE KEEPING

(71) Applicants: Hyundai Motor Company, Seoul (KR); Kia Motors Corporation, Seoul (KR)

(72) Inventor: Ki Woo Sung, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 179 days.

(21) Appl. No.: 16/832,162

(22) Filed: Mar. 27, 2020

(65) Prior Publication Data

US 2021/0171029 A1  Jun. 10, 2021

(30) Foreign Application Priority Data

Dec. 5, 2019 (KR) .................. 10-2019-0160324

(51) Int. Cl.
| | |
|---|---|
| G01C 21/36 | (2006.01) |
| B60W 30/12 | (2020.01) |
| B60W 30/095 | (2012.01) |
| B60W 50/04 | (2006.01) |
| H04W 4/46 | (2018.01) |
| G06V 20/56 | (2022.01) |

(52) U.S. Cl.
CPC ..... *G01C 21/3658* (2013.01); *B60W 30/0956* (2013.01); *B60W 30/12* (2013.01); *B60W 50/045* (2013.01); *G01C 21/367* (2013.01); *G06V 20/588* (2022.01); *H04W 4/46* (2018.02); *B60W 2050/046* (2013.01); *B60W 2422/70* (2013.01); *B60W 2530/20* (2013.01)

(58) Field of Classification Search
CPC ............. B60W 30/12; B60W 30/0956; B60W 50/045; B60W 2050/046; B60W 2422/70; B60W 2530/20; H04W 4/46; G01C 21/367; G06K 9/00798
See application file for complete search history.

(56) References Cited

U.S. PATENT DOCUMENTS

| | | | |
|---|---|---|---|
| 2013/0145835 A1* | 6/2013 | Ji ........................ | B60C 23/0488 73/146.5 |
| 2015/0348409 A1* | 12/2015 | Lykkja ................. | G07B 15/063 342/357.52 |
| 2019/0078897 A1* | 3/2019 | Sumizawa ...... | B60W 30/18145 |

* cited by examiner

*Primary Examiner* — Kenneth J Malkowski
*Assistant Examiner* — Andrew J Cromer
(74) *Attorney, Agent, or Firm* — Slater Matsil, LLP (57) ABSTRACT

A driving lane keeping control system includes a number of vehicles and a server. Each vehicle is configured to transmit wheel position information to the server. The server is configured to receive the wheel position information from each vehicle, to match the wheel position information with a detailed map to generate a moving trajectory of each vehicle, to analyze the generated moving trajectory of each vehicle to select an optimum moving trajectory, to generate virtual lane information based on the selected optimum moving trajectory, and to transmit the generated virtual lane information to at least one of the vehicles to enable the at least one vehicle to correct a driving position based on the virtual lane information.

20 Claims, 7 Drawing Sheets

SYSTEM AND METHOD FOR CONTROLLING DRIVING LANE KEEPING

CROSS-REFERENCE TO RELATED APPLICATIONS

This application claims priority to Korean Patent Application No. 10-2019-0160324, filed on Dec. 5, 2019, which application is hereby incorporated herein by reference.

TECHNICAL FIELD

The present disclosure relates to a system and method for controlling driving lane keeping.

BACKGROUND

In general, vehicle driving refers to a procedure until a vehicle is turned off by a driver or a user from a time of starting the vehicle by the driver or the user to drive the vehicle.

With regard to definition of an autonomous vehicle, the autonomous vehicle refers to a vehicle that autonomously travels to a given destination by recognizing a surrounding environment without driver intervention, determining a driving situation, and controlling the vehicle.

The autonomous vehicle reduces traffic accidents, enhances traffic efficiency, saves fuel, and substitutes for driving, and thus, is expected as a future individual transportation for enhancing convenience.

The autonomous vehicle prevents lane departure through a system such as lane departure warning (LDW), lane keeping assistance (LKA), or highly automated driving (HAD).

However, such a conventional lane departure prevention system has a problem in that it is not possible to prevent lane departure of a vehicle when lane information is insufficient.

For example, when a lane is blurred or removed, a lane is a zigzag lane, or a lane is not clear, there is a problem in terms of lane departure of a vehicle.

When lane information is insufficient, there is also a problem in that the vehicle is not aligned at the center of a road while the vehicle is autonomously driven and the vehicle is inclined to one side of the road.

As such, the autonomous vehicle has a limit in preventing lane departure and maintaining a lane using a camera and a radar (LIDAR).

Thus, in the future, there is need to develop a driving lane keeping control system for maintaining a driving lane by preventing lane departure due to insufficient lane information and correcting a vehicle position through virtual lane information.

SUMMARY

The present disclosure relates to a driving lane keeping control system and particular embodiments relate to a system and method for controlling driving lane keeping for keeping a driving lane by a vehicle through driving lane virtualization using a sensor of a tire pressure monitoring system (TPMS).

Accordingly, embodiments of the present disclosure are directed to a system and method for controlling driving lane keeping for calculating a moving trajectory of a vehicle based on a wheel position marker of the vehicle and providing virtual lane information to the vehicle, thereby keeping a driving lane by preventing lane departure due to insufficient lane information and correcting a vehicle position through the virtual lane information.

Technical problems solved by the embodiments are not limited to the above technical problems and other technical problems which are not described herein will become apparent to those skilled in the art from the following description.

As embodied and broadly described herein, a driving lane keeping control system includes a vehicle configured to transmit wheel position information and a server configured to calculate a moving trajectory of the vehicle based on the wheel position information and to provide virtual lane information to the vehicle. When receiving the wheel position information, the server matches the wheel position information with a detailed map to generate a moving trajectory of each vehicle, analyzes the generated moving trajectory of each vehicle to select an optimum moving trajectory, generates the virtual lane information based on the selected optimum moving trajectory, and transmits the generated virtual lane information to the vehicle to enable the vehicle to correct a driving position based on the virtual lane information.

In another aspect of the present disclosure, a driving lane keeping control method can be used with a driving lane keeping control system that includes a vehicle and a server that are communication-linked with each other. The method includes generating a wheel position marker and transmitting the wheel position marker to the server, by the vehicle, storing the wheel position marker received from the vehicle, by the server, matching the wheel position marker with a detailed map to generate a moving trajectory of each vehicle, by the server, analyzing the generated moving trajectory of each vehicle to select an optimum moving trajectory, by the server, generating virtual lane information based on the selected optimum moving trajectory, by the server, transmitting the generated virtual lane information to the vehicle, by the server, and correcting a driving position based the virtual lane information received from the server, by the vehicle.

In another aspect of the present disclosure, a computer-readable recording medium having recorded thereon a program for executing the driving lane keeping control method of a driving lane keeping control system performs procedures provided in the driving lane keeping control method of a driving lane keeping control system.

In another aspect of the present disclosure, a vehicle of a driving lane keeping control system, the vehicle includes a communicator communication-linked with a server, a wheel position information acquirer configured to acquire wheel position information of a subject vehicle, and a controller configured to generate a wheel position marker based on the acquired wheel position information and to control the communicator to transmit the wheel position marker to the server.

In another aspect of the present disclosure, a server of a driving lane keeping control system includes a communicator communication-linked with a vehicle, a database configured to store wheel position information received from the vehicle, and a virtual lane information generator configured to match the wheel position information with a detailed map to generate a moving trajectory of each vehicle, to analyze the generated moving trajectory of each vehicle to select an optimum moving trajectory, to generate the virtual lane information based on the selected optimum moving trajectory, and to transmit the generated virtual lane information to the vehicle through the communicator.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF ILLUSTRATIVE EMBODIMENTS

Hereinafter, the embodiments of the present disclosure will be described in detail with reference to the accompanying drawings so as to be easily implemented by those skilled in the art. However, the present disclosure may be variously implemented and is not limited to the embodiments described herein. In the drawings, in order to clearly describe the present disclosure, portions which are not related to the description of the present disclosure will be omitted and similar portions are denoted by similar reference numerals throughout the specification.

In the entire specification, when a certain portion "includes" a certain component, this indicates that other components are not excluded, but may be further included unless specially described. The terms "unit", "-or/er" and "module" described in the specification indicate a unit for processing at least one function or operation, which may be implemented by hardware, software or a combination thereof.

Throughout the specification, when a certain portion "includes" a certain component, this indicates that the other components are not excluded, but may be further included unless specially described. The same reference numbers will be used throughout the drawings to refer to the same or like parts.

Hereinafter, a system and method of controlling driving lane keeping to which embodiments of the present disclosure are applicable will be described in detail with reference to FIGS. 1 to 10.

Figure 1:
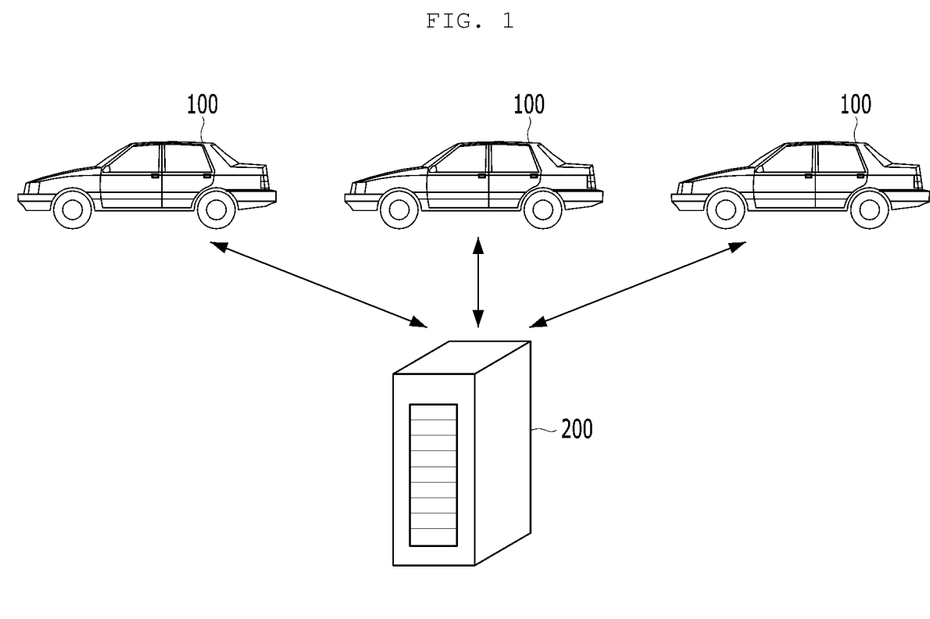
FIG. 1 is a diagram for explaining a driving lane keeping control system according to an embodiment of the present disclosure.

FIG. 1 is a diagram for explaining a driving lane keeping control system according to an embodiment of the present disclosure.

As shown in FIG. 1, the driving lane keeping control system according to the present disclosure may include a vehicle 100 for transmitting wheel position information, and a server 200 for providing virtual lane information to the vehicle 100 by calculating a moving trajectory of a vehicle based on the wheel position information.

Here, the vehicle 100 may include at least one of an autonomous vehicle, a manual driving vehicle, or a semi-autonomous vehicle, but the present disclosure is not limited thereto.

The vehicle 100 may acquire wheel position information of a subject vehicle, may generate a wheel position marker based on the acquired wheel position information, and may transmit the wheel position marker to the server 200.

Here, the vehicle 100 may include a wheel position information acquirer for acquiring the wheel position information of the subject vehicle.

For example, the wheel position information acquirer may include a global positioning system (GPS) and a tire pressure monitoring system (TPMS), but the present disclosure is not limited thereto.

When generating the wheel position marker, the vehicle 100 may generate one wheel position marker corresponding to one turn for each setting time, but the present disclosure is not limited thereto.

When receiving the virtual lane information from the server 200, the vehicle 100 may correct or maintain a driving position of the subject vehicle based on the virtual lane information.

When receiving the wheel position information of the vehicle 100, the server 200 may match the wheel position information with a detailed map to generate the moving trajectory of each vehicle 100, may select an optimum moving trajectory by analyzing the generated moving trajectory of each vehicle 100, may generate the virtual lane information based on the selected optimum moving trajectory, and may transmit the generated virtual lane information to the vehicle 100 in order to enable the vehicle 100 to correct the driving position based on the virtual lane information.

Here, during reception of the wheel position information, when receiving wheel position information of a first vehicle from the first vehicle, the server 200 may acquire and store wheel position information of second vehicles that travel earlier than the first vehicle on a road on which the first vehicle travels.

During reception of wheel position information, if receiving the wheel position information, the server 200 may calculate all wheel positions based on the wheel position marker included in the wheel position information.

When calculating the wheel position of the vehicle 100, the server 200 may check a wheel position corresponding to the wheel position marker and may calculate each wheel position of remaining wheels based on a distance between a wheel position corresponding to the wheel position marker and the remaining wheels.

For example, when calculating the wheel position of the vehicle 100, the server 200 may check one wheel position corresponding to one wheel position marker when one wheel position marker is included in the wheel position information, and may calculate a wheel position of each of the three remaining wheels based on a distance between one wheel position corresponding to the wheel position marker and the three remaining wheels.

That is, during calculation of the wheel position of the vehicle 100, when one wheel position corresponding to the wheel position marker is a front left wheel, the server 200 may calculate a first distance between the front left wheel and a front right wheel positioned horizontally to the front left wheel, may calculate a second distance between the front left wheel and a rear left wheel positioned perpendicularly to the front left wheel, may calculate a third distance between the front left wheel and a rear right wheel positioned diagonally to the front left wheel, and may calculate a position of each wheel based on the calculated first, second, and third distances.

In another example, during calculation of the wheel position of the vehicle 100, when two wheel position markers are included in the wheel position information, the server 200 may check two wheel positions corresponding to the two wheel position markers, and may calculate a wheel position of each of the two remaining wheels based on a distance between two wheel positions corresponding to the wheel position markers and the two remaining wheels.

Then, when generating the moving trajectory of each vehicle 100, the server 200 may match the wheel position marker included in the wheel position information with a detailed map, and may connect a plurality of wheel position markers matched with the detailed map to generate the moving trajectory of each vehicle.

Here, when matching the wheel position marker included in the wheel position information with the detailed map, the server 200 may indicate wheel position markers on the detailed map per second, but the present disclosure is not limited thereto.

For example, when connecting the plurality of wheel position markers matched with the detailed map, the server 200 may connect the wheel position markers using a smoothing method.

Then, when generating the moving trajectory of each vehicle, the server 200 may generate all moving trajectories of second vehicles that travel earlier than the first vehicle on a road on which the first vehicle travels.

When selecting an optimum moving trajectory, the server 200 may analyze a moving trajectory of each vehicle to calculate an average value and a mode value of the moving trajectory of each vehicle, and may select an optimum moving trajectory based on the calculated average value and mode value.

Here, when selecting the optimum moving trajectory, the server 200 may set a confidence interval, may determine a section other than the set confidence interval as noise, and may remove the section determined as noise.

For example, the confidence interval may be a section between +2σ and −2σ based on the average value of the moving trajectory of each vehicle, but the present disclosure is not limited thereto.

As necessary, when selecting the optimum moving trajectory, the server 200 may analyze and learn the moving trajectory of each vehicle 100 to predict a driving route of each vehicle 100 and may also select the optimum moving trajectory based on the predicted driving route.

Here, when predicting the driving route of each vehicle 100, the server 200 may learn the moving trajectory of each vehicle 100 based on a deep neural network (DNN) learning method and may predict the driving route of each vehicle 100.

As such, according to the present disclosure, a moving trajectory of a vehicle may be calculated based on a wheel position marker of the vehicle and virtual lane information may be provided to the vehicle, and thus a driving lane may be kept by preventing lane departure due to insufficient lane information and correcting a vehicle position through the virtual lane information.

That is, according to the present disclosure, driving lane virtualization may be performed through a digital wheel position marker using a tire pressure monitoring system (TPMS), thereby overcoming problems such as lane departure due to insufficient lane information such as lane departure warning (LDW), lane keeping assistance (LKA), or highly automated driving (HAD).

According to the present disclosure, lane recognition and lane center conformability of an autonomous vehicle may be enhanced, thereby removing anxiety of a driver.

The present disclosure may prevent a phenomenon in that a vehicle is not aligned at the center of a road while the vehicle is driven and the vehicle is inclined to one side of the road, using an advanced driver assistance system (ADAS).

Figure 2:
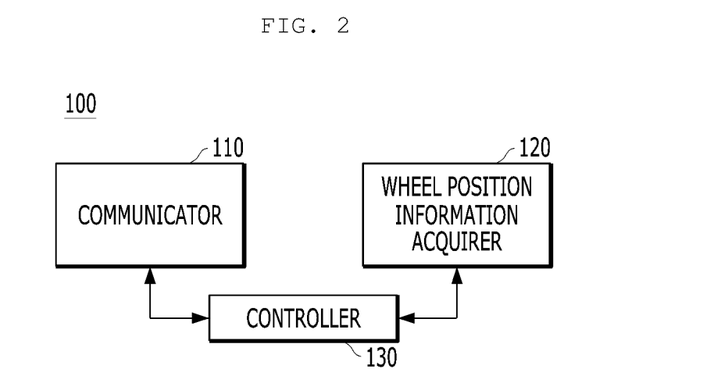
FIG. 2 is a block diagram for explaining a vehicle of a driving lane keeping control system according to an embodiment of the present disclosure.
Figure 3:
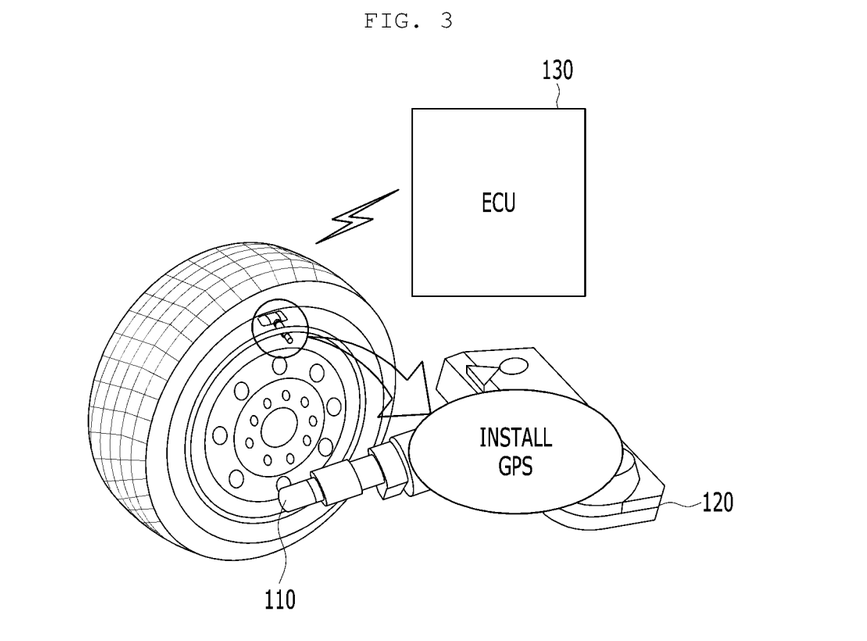
FIG. 3 is a diagram for explaining a wheel position information acquirer of a vehicle.

FIG. 2 is a block diagram for explaining a vehicle of a driving lane keeping control system according to an embodiment of the present disclosure. FIG. 3 is a diagram for explaining a wheel position information acquirer of a vehicle.

As shown in FIGS. 2 and 3, the vehicle 100 of the driving lane keeping control system according to the present disclosure may include a communicator 110 that is communication-linked with a server, a wheel position information acquirer 120 for acquiring wheel position information, and a controller 130 for generating a wheel position marker based on the acquired wheel position information and controlling the communicator 110 to transmit the wheel position marker to the server.

Here, the wheel position information acquirer 120 may include a global positioning system (GPS) and a tire pressure monitoring system (TPMS), but the present disclosure is not limited thereto.

Only one wheel position information acquirer 120 may be installed at a front wheel of the vehicle.

As necessary, one wheel position information acquirer 120 may be installed at a front wheel of the vehicle and one wheel position information acquirer 120 may be installed at a rear wheel.

When generating the wheel position marker, the controller 130 may generate one wheel position marker corresponding to one turn for each setting time.

For example, the controller 130 may generate one wheel position marker per second, but the present disclosure is not limited thereto.

When receiving the virtual lane information from the server, the controller 130 may correct or maintain a driving position of a subject vehicle based on the virtual lane information.

Here, when correcting the driving position based on the virtual lane information, the controller 130 may associate at least one of camera information, radar information, or LIDAR information of the subject vehicle with the virtual lane information and may correct the driving position of the subject vehicle.

Figure 4:
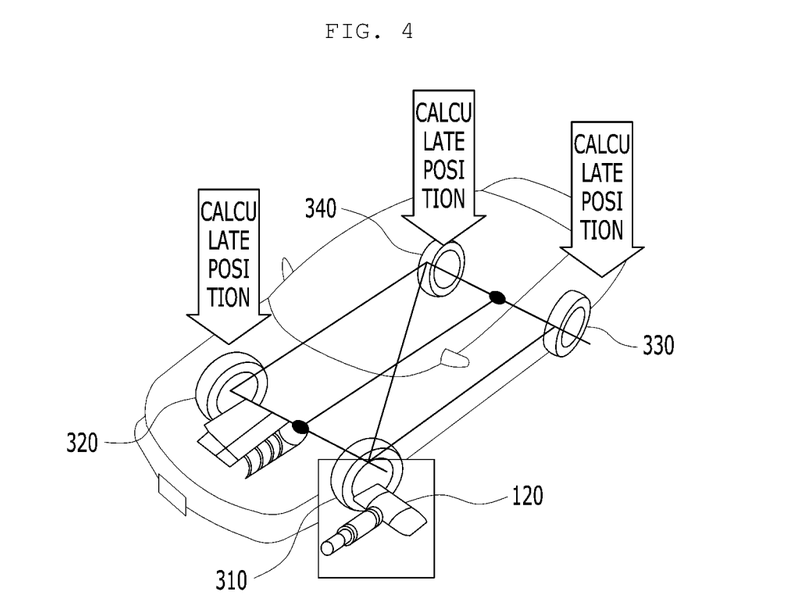
FIG. 4 is a diagram for explaining a procedure of calculating a wheel position.

FIG. 4 is a diagram for explaining a procedure of calculating a wheel position.

When receiving wheel position information of a subject vehicle, including a wheel position marker, from a plurality of vehicles, the server may store wheel position information corresponding to each vehicle in a database.

Here, during reception of the wheel position information, when receiving wheel position information of a first vehicle from the first vehicle, the server may acquire wheel position information of second vehicles that travel earlier than the first vehicle on a road on which the first vehicle travels and may store the acquired wheel position information in a database.

As shown in FIG. 4, when receiving the wheel position information, the server may calculate all wheel positions of the vehicle based on the wheel position marker included in the wheel position information.

Here, when calculating the wheel position of the vehicle, the server may check a wheel position corresponding to the wheel position marker, and may calculate each wheel position of the remaining wheels based on a distance between a wheel position corresponding to the wheel position marker and the remaining wheels.

For example, during reception of the wheel position of the vehicle, if one wheel position marker is included in the wheel position information, the server may check one wheel position corresponding to one wheel position marker, and may calculate each wheel position of three remaining wheels based on a distance between one wheel position corresponding to the wheel position marker and the three remaining wheels.

That is, as shown in FIG. 4, during reception of the wheel position of the vehicle, when one wheel position corresponding to the wheel position marker acquired from the wheel position information acquirer 120 is a front left wheel 310, the server may calculate a first distance between the front left wheel 310 and a front right wheel 320 positioned horizontally to the front left wheel 310, may calculate a second distance between the front left wheel 310 and a rear left wheel 330 positioned perpendicularly to the front left wheel 310, may calculate a third distance between the front left wheel 310 and a rear right wheel 340 positioned diagonally to the front left wheel 310, and may calculate a position of each wheel based on the calculated first, second, and third distances.

That is, the server may use the specification of each vehicle to calculate a wheel position of a vehicle.

Figure 5:
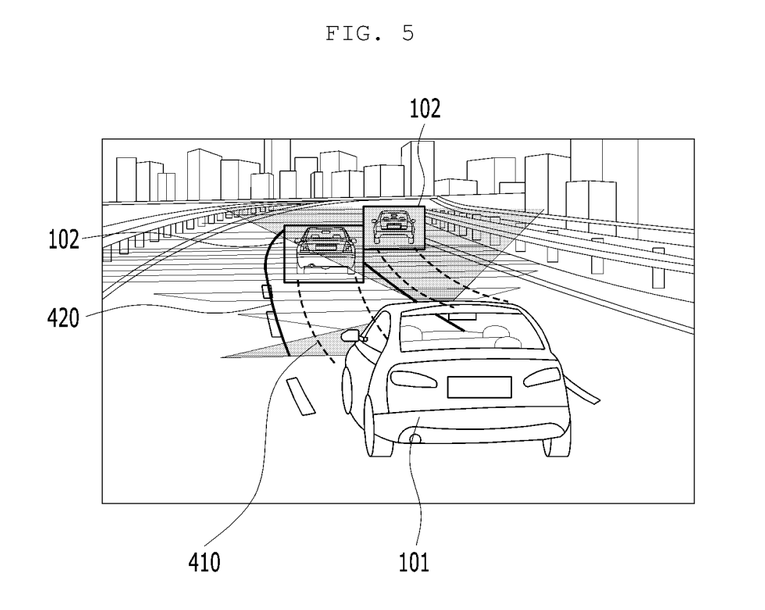
FIGS. 5 and 6 are diagrams for explaining a procedure of generating a moving trajectory of a vehicle.
Figure 6:
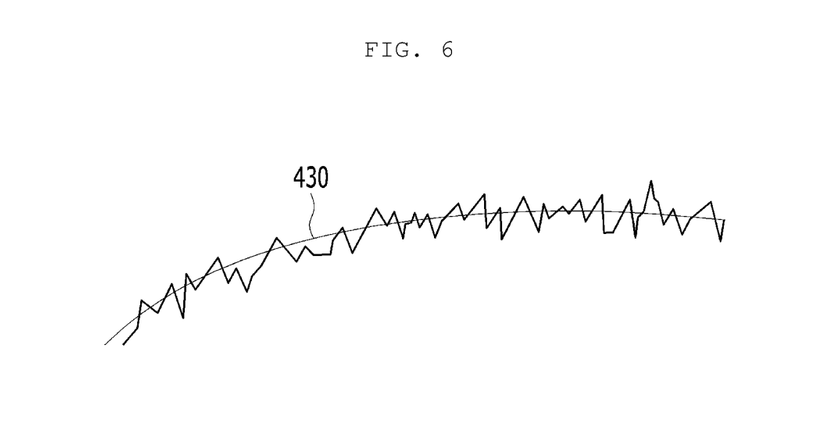

FIGS. 5 and 6 are diagrams for explaining a procedure of generating a moving trajectory of a vehicle.

As shown in FIGS. 5 and 6, a server may match wheel position information of a vehicle with a detailed map to generate a moving trajectory 410 of each vehicle.

Here, when generating the moving trajectory 410 of each vehicle, the server may match a wheel position marker included in the wheel position information with the detailed map, and may connect a plurality of wheel position markers matched with the detailed map with each other to generate the moving trajectory 410 of each vehicle.

Here, when matching the wheel position marker included in the wheel position information with the detailed map, the server may display the wheel position markers on the detailed map per second, but the present disclosure is not limited thereto.

For example, as shown in FIG. 6, when connecting the plurality of wheel position markers matched with the detailed map, the server may connect the wheel position markers using a smoothing method.

Here, a connection line 430 formed by connecting the wheel position markers may be displayed as a moving trajectory of a vehicle.

Then, as shown in FIG. 5, when generating the moving trajectory 410 of each vehicle, the server may generate both a moving trajectory and the moving trajectory 410 of second vehicles 102 that travel earlier than the first vehicle 101 on a road on which a first vehicle 101 travels.

Here, the server may generate a virtual lane 420 based on the moving trajectories 410.

Figure 7:
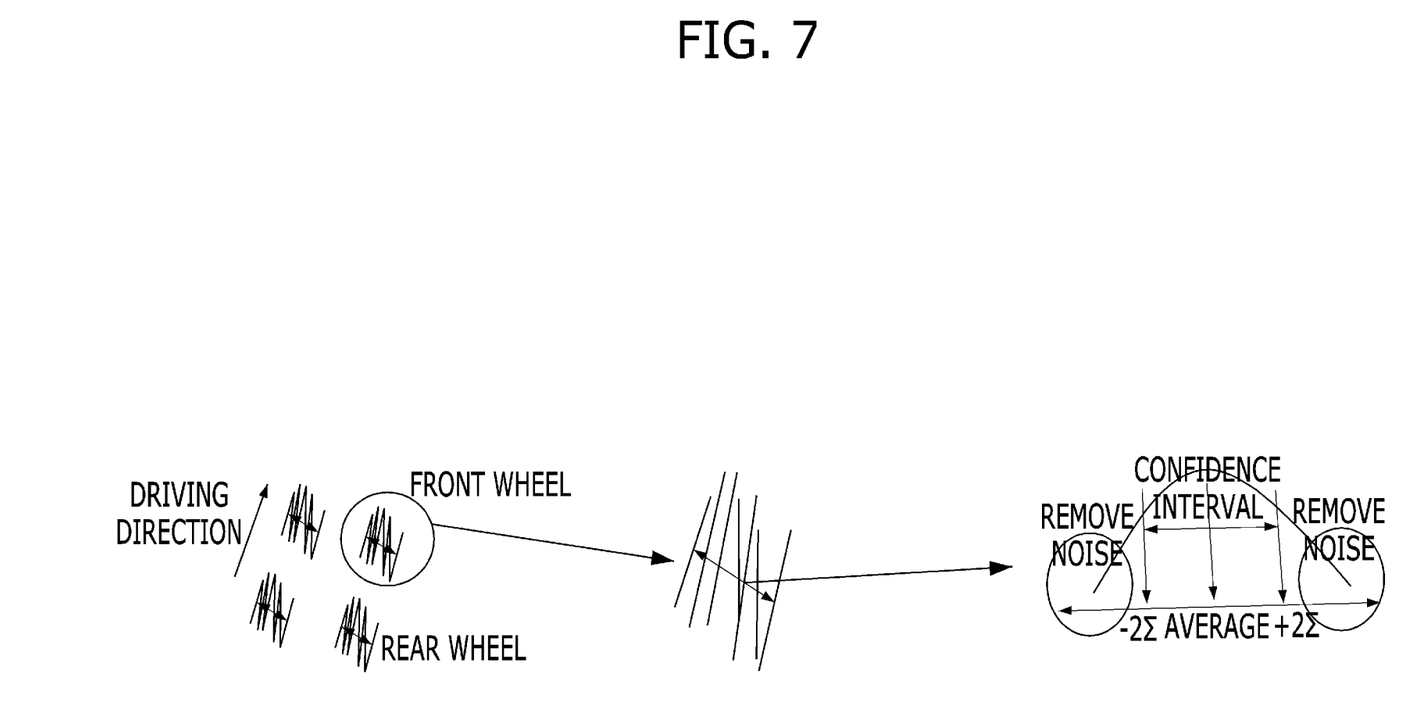
FIGS. 7 and 8 are diagrams for explaining a procedure of selecting an optimum moving trajectory.
Figure 8:
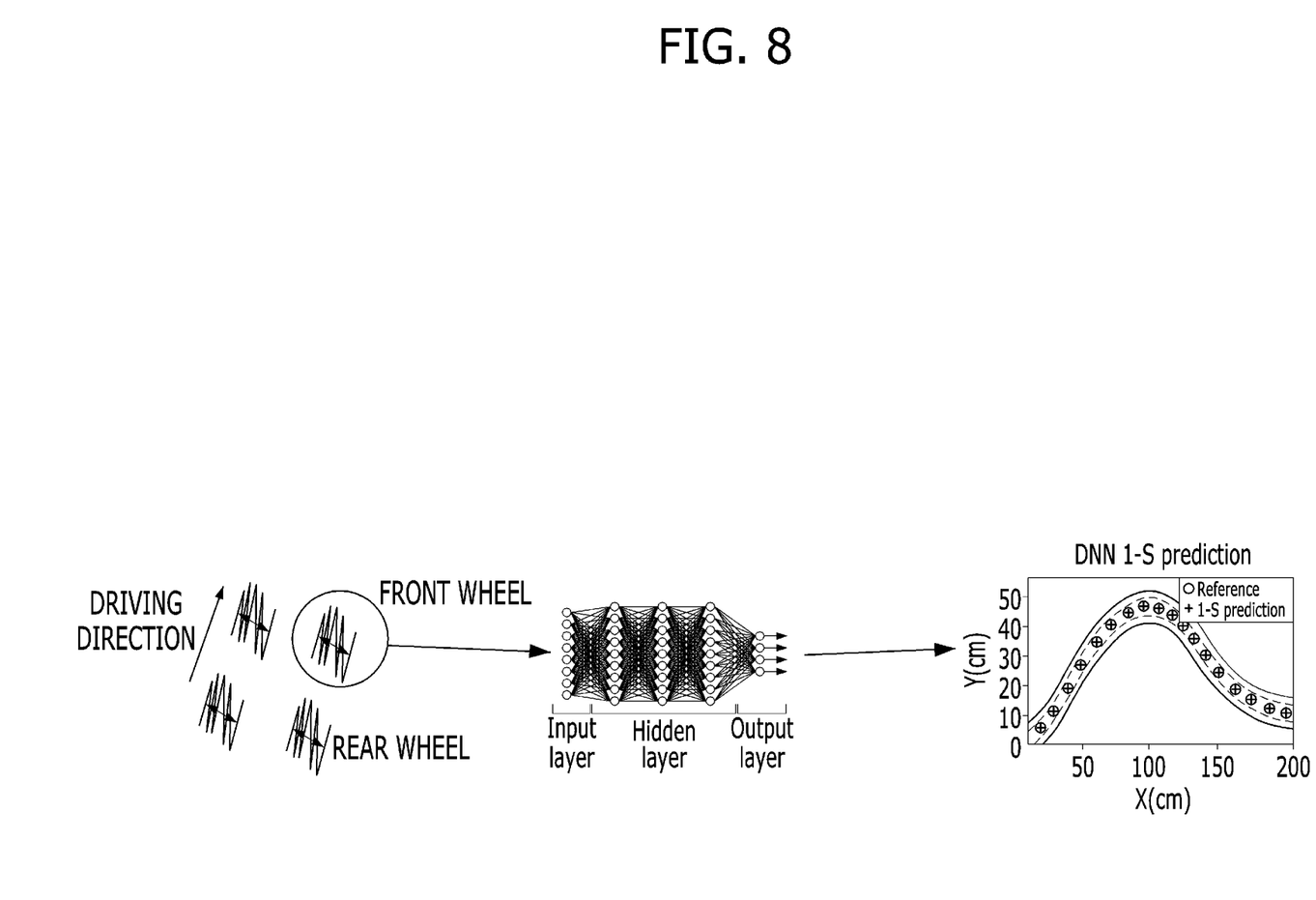

FIGS. 7 and 8 are diagrams for explaining a procedure of selecting an optimum moving trajectory.

As shown in FIGS. 7 and 8, the server may analyze a moving trajectory of each vehicle to select an optimum moving trajectory and may generate virtual lane information based on the selected optimum moving trajectory.

According to a first embodiment, as shown in FIG. 7, when selecting the optimum moving trajectory, the server may analyze the moving trajectory of each vehicle to calculate an average value and mode value of the moving trajectory of each vehicle, and may select the optimum moving trajectory based on the calculated average value and mode value.

Here, when selecting the optimum moving trajectory, the server may set a confidence interval, may determine a section other than the set confidence interval as noise, and may remove the section determined as noise.

For example, the confidence interval may be a section between +2σ and −2σ based on the average value of the moving trajectory of each vehicle, but the present disclosure is not limited thereto.

In addition, a noise section may include lane driving, fault driving, inexperienced driving, or the like.

According to a second embodiment, as shown in FIG. 8, when selecting the optimum moving trajectory, the server may analyze and learn the moving trajectory of each vehicle to predict a driving route of each vehicle and may also select the optimum moving trajectory based on the predicted driving route.

Here, when predicting the driving route of each vehicle, the server may learn the moving trajectory of each vehicle based on a deep neural network (DNN) learning method and may predict the driving route of each vehicle.

Figure 9:
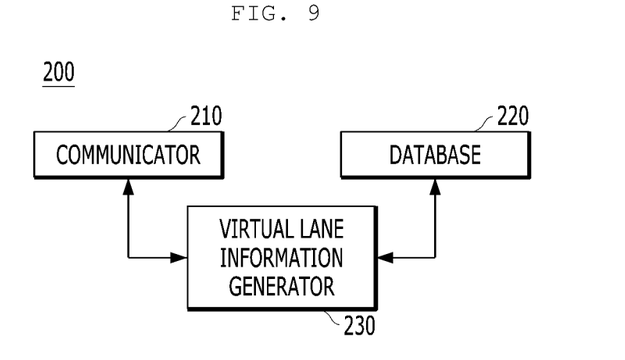
FIG. 9 is a block diagram for explaining a server of a driving lane keeping control system according to an embodiment of the present disclosure.

FIG. 9 is a block diagram for explaining a server of a driving lane keeping control system according to an embodiment of the present disclosure.

As shown in FIG. 9, the server 200 may include a communicator 210 that is communication-linked with a vehicle, a database 220 for storing wheel position information received from the vehicle, and a virtual lane information generator 230.

Here, the virtual lane information generator 230 may match the wheel position information with a detailed map to generate a moving trajectory of each vehicle, may analyze the generated moving trajectory of each vehicle to select an optimum moving trajectory, may generate virtual lane information based on the selected optimum moving trajectory, and may transmit the generated virtual lane information to the vehicle through the communicator 210.

During reception of the wheel position information, when receiving wheel position information of a first vehicle from the first vehicle, the virtual lane information generator 230 may acquire and store wheel position information of second vehicles that travel earlier than the first vehicle on a road on which the first vehicle travels.

Then, during reception of the wheel position information, when receiving the wheel position information, the virtual lane information generator 230 may calculate all wheel positions of the vehicle based on a wheel position marker included in the wheel position information.

Here, while calculating the wheel position of the vehicle, the virtual lane information generator 230 may check a wheel position corresponding to the wheel position marker and may calculate a wheel position of each of the remaining wheels based on a distance between the remaining wheels and the wheel position corresponding to the wheel position marker.

For example, during calculation of the wheel position of a vehicle, when one wheel position marker is included in the wheel position information, the virtual lane information generator 230 may check one wheel position corresponding to one wheel position marker, and may calculate a wheel position of each of the three remaining wheels based on a distance between one wheel position corresponding to the wheel position marker and the three remaining wheels.

That is, during calculation of the wheel position of the vehicle, when one wheel position corresponding to the wheel position marker is a front left wheel, the virtual lane information generator 230 may calculate a first distance between the front left wheel and a front right wheel positioned horizontally to the front left wheel, may calculate a second distance between the front left wheel and a rear left wheel positioned perpendicularly to the front left wheel, may calculate a third distance between the front left wheel and a rear right wheel positioned diagonally to the front left wheel, and may calculate a position of each wheel based on the calculated first, second, and third distances.

In another example, during calculation of the wheel position of the vehicle, when two wheel position markers are included in the wheel position information, the virtual lane information generator 230 may check two wheel positions corresponding to the two wheel position markers, and may calculate a wheel position of each of the two remaining wheels based on a distance between two wheel positions corresponding to the wheel position markers and the two remaining wheels.

Then, when generating the moving trajectory of each vehicle, the virtual lane information generator 230 may match the wheel position marker included in the wheel position information with a detailed map, and may connect a plurality of wheel position markers matched with the detailed map to generate the moving trajectory of each vehicle.

Here, when matching the wheel position marker included in the wheel position information with the detailed map, the virtual lane information generator 230 may indicate wheel position markers on the detailed map per second, but the present disclosure is not limited thereto.

For example, when connecting the plurality of wheel position markers matched with the detailed map, the virtual lane information generator 230 may connect the wheel position markers using a smoothing method.

Then, when generating the moving trajectory of each vehicle, the virtual lane information generator 230 may generate all moving trajectories of second vehicles that travel earlier than the first vehicle on a road on which the first vehicle travels.

When selecting an optimum moving trajectory, the virtual lane information generator 230 may analyze a moving trajectory of each vehicle to calculate an average value and a mode value of the moving trajectory of each vehicle, and may select an optimum moving trajectory based on the calculated average value and mode value.

Here, when selecting the optimum moving trajectory, the virtual lane information generator 230 may set a confidence interval, may determine a section other than the set confidence interval as noise, and may remove the section determined as noise.

For example, the confidence interval may be a section between +2σ and −2σ based on the average value of the moving trajectory of each vehicle, but the present disclosure is not limited thereto.

As necessary, when selecting the optimum moving trajectory, the virtual lane information generator 230 may analyze and learn the moving trajectory of each vehicle to predict a driving route of each vehicle and may also select the optimum moving trajectory based on the predicted driving route.

Here, when predicting the driving route of each vehicle 100, the virtual lane information generator 230 may learn the moving trajectory of each vehicle 100 based on a deep neural network (DNN) learning method and may predict the driving route of each vehicle 100.

Figure 10:
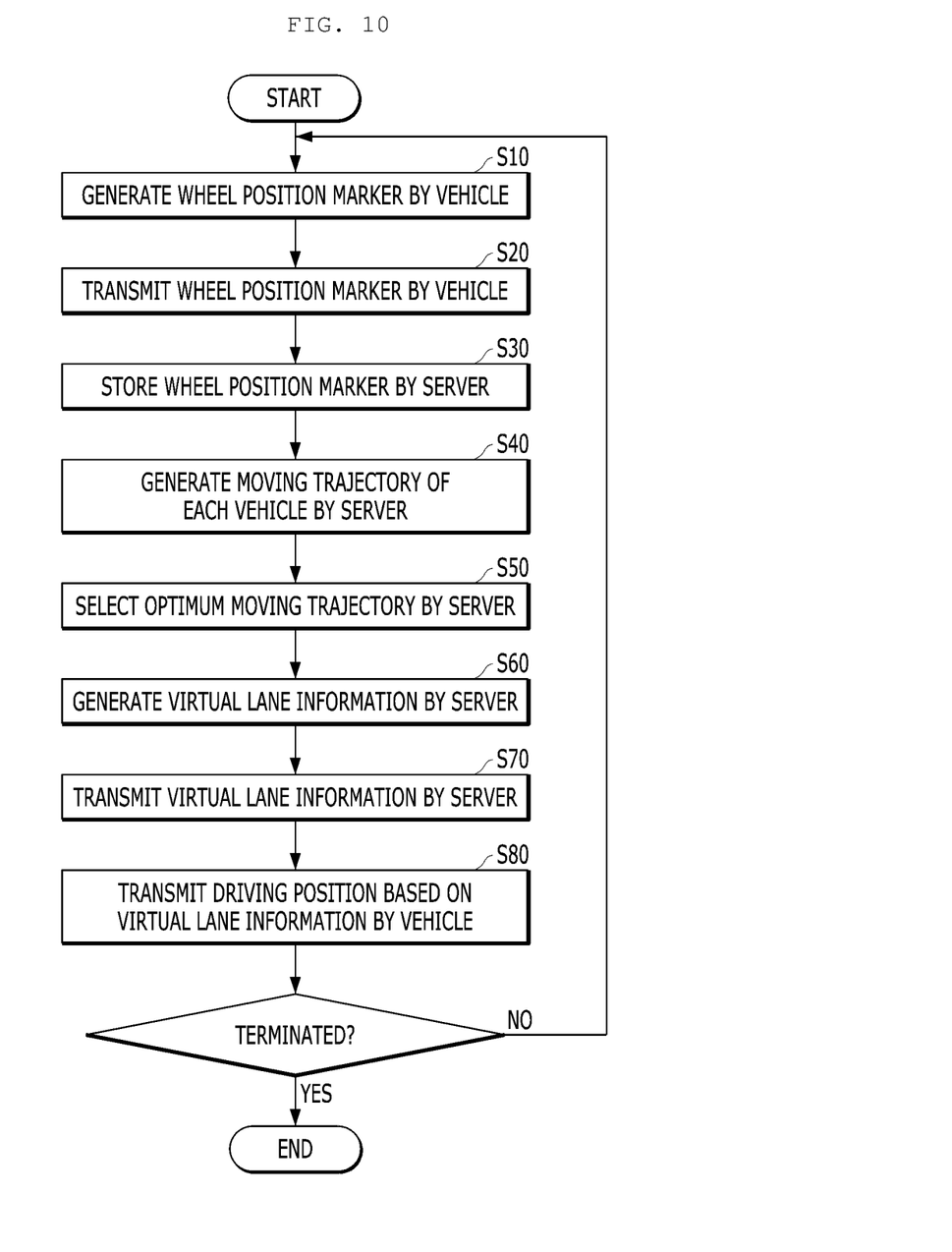
FIG. 10 is a flowchart for explaining a driving lane keeping control method of a driving lane keeping control system according to an embodiment of the present disclosure.

FIG. 10 is a flowchart for explaining a driving lane keeping control method of a driving lane keeping control system according to an embodiment of the present disclosure.

As shown in FIG. 10, a vehicle may generate a wheel position marker of a subject vehicle (S10) and may transmit the generated wheel position marker to a server (S20).

Here, the vehicle may acquire wheel position information and may generate a wheel position marker based on the acquired wheel position information.

For example, when generating the wheel position marker, the vehicle may generate one wheel position marker corresponding to one turn for each setting time.

The server may store the wheel position marker received from the vehicle (S30).

Here, when receiving a wheel position marker of a first vehicle from the first vehicle, the server may acquire and store wheel position information of second vehicles that travel earlier than the first vehicle on a road on which the first vehicle travels.

When receiving the wheel position marker, the server may calculate all wheel positions of the vehicle based on the wheel position marker.

That is, the server may check a wheel position corresponding to the wheel position marker and may calculate each wheel position of remaining wheels based on a distance between a wheel position corresponding to the wheel position marker and the remaining wheels.

Then, the server may match the wheel position marker with a detailed map to generate a moving trajectory of each vehicle (S40).

Here, the server may match the wheel position marker with the detailed map, and may connect a plurality of wheel position markers matched with the detailed map to generate the moving trajectory of each vehicle.

For example, when matching the wheel position marker with the detailed map, the server may indicate wheel position markers on the detailed map per second.

When connecting the plurality of wheel position markers matched with the detailed map, the server may connect the wheel position markers using a smoothing method.

When generating the moving trajectory of each vehicle, the server may generate all moving trajectories of second vehicles that travel earlier than the first vehicle on a road on which the first vehicle travels.

Then, the server may analyze the generated moving trajectory of each vehicle to select an optimum moving trajectory (S50).

Here, when selecting the optimum moving trajectory, the server may analyze a moving trajectory of each vehicle to calculate an average value and a mode value of the moving trajectory of each vehicle, and may select an optimum moving trajectory based on the calculated average value and mode value.

That is, when selecting the optimum moving trajectory, the server may set a confidence interval, may determine a section other than the set confidence interval as noise, and may remove the section determined as noise.

In another case, when selecting the optimum moving trajectory, the server may analyze and learn the moving trajectory of each vehicle to predict a driving route of each vehicle and may also select the optimum moving trajectory based on the predicted driving route.

For example, when predicting the driving route of each vehicle, the server may learn the moving trajectory of each vehicle based on a deep neural network (DNN) learning method and may predict the driving route of each vehicle.

The server may generate virtual lane information based on the selected optimum moving trajectory (S60).

Then, the server may transmit the generated virtual lane information to the vehicle (S70).

Then, the vehicle may correct a driving position based on the virtual lane information received from the server (S80).

Here, when correcting the driving position based on the virtual lane information, the vehicle may associate at least one of camera information, radar information, or LIDAR information of the subject vehicle with the virtual lane information and may correct the driving position of the subject vehicle.

Then, the vehicle may check whether there is a request for termination of control of driving lane keeping (S90) and may terminate control of driving lane keeping when there is the request for termination of control of driving lane keeping.

According to the present disclosure, a computer-readable recording medium having recorded thereon a program for executing a driving lane keeping control method of a driving lane keeping control system may perform procedures provided in the driving lane keeping control method of the driving lane keeping control system.

As such, according to the present disclosure, a moving trajectory of a vehicle may be calculated based on a wheel position marker of the vehicle and virtual lane information may be provided to the vehicle, and thus a driving lane may be kept by preventing lane departure due to insufficient lane information and correcting a vehicle position through the virtual lane information.

That is, according to the present disclosure, driving lane virtualization may be performed through a digital wheel position marker using a tire pressure monitoring system (TPMS), thereby overcoming problems such as lane departure due to insufficient lane information such as lane departure warning (LDW), lane keeping assistance (LKA), or highly automated driving (HAD).

According to the present disclosure, lane recognition and lane center conformability of an autonomous vehicle may be enhanced, thereby removing anxiety of a driver.

The present disclosure may prevent a phenomenon in that a vehicle is not aligned at the center of a road while the vehicle is driven and the vehicle is inclined to one side of the road, using an advanced driver assistance system (ADAS).

According to the driving lane keeping control system and the driving lane keeping control method of the driving lane keeping control system related to at least one embodiment of the present disclosure as configured above, a moving trajectory of a vehicle may be calculated based on a wheel position marker of the vehicle and virtual lane information may be provided to the vehicle, and thus a driving lane may be kept by preventing lane departure due to insufficient lane information and correcting a vehicle position through the virtual lane information.

That is, according to the present disclosure, driving lane virtualization may be performed through a digital wheel position marker using a tire pressure monitoring system (TPMS), thereby overcoming problems such as lane departure due to insufficient lane information such as lane departure warning (LDW), lane keeping assistance (LKA), or highly automated driving (HAD).

According to the present disclosure, lane recognition and lane center conformability of an autonomous vehicle may be enhanced, thereby removing anxiety of a driver.

The present disclosure may prevent a phenomenon in that a vehicle is not aligned at the center of a road while the vehicle is driven and the vehicle is inclined to one side of the road, using an advanced driver assistance system (ADAS).

It will be appreciated by persons skilled in the art that that the effects that could be achieved with the present disclosure are not limited to what has been particularly described hereinabove and other advantages of the present disclosure will be more clearly understood from the detailed description.

The invention can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, and optical data storage devices.

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A driving lane keeping control system for autonomous vehicles, the system comprising:
a plurality of autonomous vehicles, each autonomous vehicle including a plurality of wheels, a wheel position information acquirer configured to acquire wheel position information of the autonomous vehicle by generating a wheel position marker based on the wheel position information of the autonomous vehicle, one wheel position marker being generated corresponding to one turn for each setting time, each autonomous vehicle further configured to transmit the wheel position information; and
a server including a processor and configured to
receive the wheel position information from each autonomous vehicle,
to match the wheel position information from each autonomous vehicle with a detailed map to generate a moving trajectory of each autonomous vehicle,
to analyze the generated moving trajectory of each autonomous vehicle to select an optimum moving trajectory,
to generate virtual lane information based on the selected optimum moving trajectory, and
to transmit the generated virtual lane information to a first autonomous vehicle of the autonomous vehicles to enable the driving lane keeping control system of the first autonomous vehicle to correct a driving position based on the virtual lane information so that the first autonomous vehicle can utilize the generated virtual lane information for lane recognition and lane center conformability when an actual lane is blurred or removed, is a zigzag lane, or is not clear so that the driving lane keeping control system can correct or maintain a driving position of the first autonomous vehicle to be centered in the virtual lane,
wherein, when generating the moving trajectory of each autonomous vehicle, the server matches the wheel position marker included in the wheel position information with the detailed map and connects a plurality of wheel position markers matched with the detailed map to generate the moving trajectory of each autonomous vehicle;
wherein the first autonomous vehicle is configured to control a driving position by correcting or maintaining based on the virtual lane information so that the first autonomous vehicle is centered of the virtual lane;
wherein the server is configured to calculate all wheel positions of each autonomous vehicle based on a wheel position marker included in the wheel position information of each autonomous vehicle; and
when calculating the wheel position of each vehicle, the server is configured to check one wheel position corresponding to one wheel position marker of one of the wheels when one wheel position marker is included in the wheel position information, and to calculate a wheel position of each of the remaining wheels based on a distance between the one wheel position and wheel positions of the remaining wheels.

2. The system of claim 1, wherein the wheel position information acquirer includes a global positioning system (GPS) and a tire pressure monitoring system (TPMS).

3. The system of claim 1, wherein the wheel position information received by the server includes wheel position information of autonomous vehicles that travelled earlier than the first autonomous vehicle on a road on which the first autonomous vehicle travels.

4. The system of claim 3, wherein the wheel position information acquirer includes a global positioning system (GPS) and a tire pressure monitoring system (TPMS).

5. The system of claim 1, wherein, when selecting the optimum moving trajectory, the server is configured to analyze the moving trajectory of each autonomous vehicle to calculate an average value and a mode value of the moving trajectory of each autonomous vehicle, and to select the optimum moving trajectory based on the calculated average value and mode value.

6. The system of claim 5, wherein, when selecting the optimum moving trajectory, the server is configured to set a confidence interval, to determine a section other than the set confidence interval as noise, and to remove the section determined as noise.

7. The system of claim 5, wherein the wheel position information acquirer includes a global positioning system (GPS) and a tire pressure monitoring system (TPMS).

8. The system of claim 1, wherein, when selecting the optimum moving trajectory, the server is configured to analyze and to learn the moving trajectory of each autonomous vehicle to predict a driving route of each autonomous vehicle and to select the optimum moving trajectory based on the predicted driving route.

9. The system of claim 8, wherein the wheel position information acquirer includes a global positioning system (GPS) and a tire pressure monitoring system (TPMS).

10. A driving lane keeping control method comprising:
receiving, at a server, wheel position markers generated by a plurality of autonomous vehicles including a first autonomous vehicle, the wheel position markers generated by generating one wheel position marker corresponding to one turn for each setting time;
storing, by the server, the wheel position marker received from the first autonomous vehicle;
matching, by the server, the wheel position marker received from the first autonomous vehicle with a detailed map to generate a moving trajectory of the first autonomous vehicle;
analyzing, by the server, the generated moving trajectory of the first autonomous vehicle to select an optimum moving trajectory;
matching, by the server, the wheel position markers generated by the plurality of autonomous vehicles with the detailed map and connecting a plurality of the wheel position markers matched with the detailed map to generate a moving trajectory of each autonomous vehicle of the plurality of autonomous vehicles;
generating, by the server, virtual lane information based on the selected optimum moving trajectory and the moving trajectory of each autonomous vehicle when a lane is blurred or removed, a lane is a zigzag lane, or a lane is not clear;
transmitting the generated virtual lane information from the server to the first autonomous vehicle so that a control system of the first autonomous vehicle can correct a driving position based the virtual lane information received from the server; and
controlling operation of the first autonomous vehicle by correcting or maintaining a driving position of the first autonomous vehicle based on the virtual lane information so that the first autonomous vehicle is centered of the virtual lane;
wherein storing the wheel position marker received from the first autonomous vehicle comprises calculating all wheel positions of each autonomous vehicle based on a wheel position marker included in wheel position information of each autonomous vehicle; and
wherein, when calculating the wheel position of each vehicle, the method comprises checking, by the server, one wheel position corresponding to one wheel position marker when one wheel position marker is included in the wheel position information, and calculating a wheel position of each of the three remaining wheels based on a distance between one wheel position corresponding to the wheel position marker and the remaining wheels.

11. The method of claim 10, further comprising acquiring and storing a wheel position marker of second vehicles that travel earlier than the first autonomous vehicle on a road on which the first autonomous vehicle travels.

12. The method of claim 10, wherein selecting the optimum moving trajectory comprises analyzing the moving trajectory of each autonomous vehicle of the plurality of autonomous vehicles to calculate an average value and a mode value of the moving trajectory of each autonomous vehicle, and selecting the optimum moving trajectory based on the calculated average value and mode value.

13. The method of claim 10, wherein selecting the optimum moving trajectory comprises analyzing and learning the moving trajectory of each autonomous vehicle of the plurality of autonomous vehicles to predict a driving route of each autonomous vehicle and selecting the optimum moving trajectory based on the predicted driving route.

14. A method of operating an autonomous vehicle, the method comprising:
generating a wheel position marker at the autonomous vehicle, wherein generating the wheel position marker comprises generating one wheel position marker corresponding to one turn for each setting time;
transmitting the wheel position marker to a server to match the wheel position marker with a detailed map to generate a moving trajectory of the autonomous vehicle and to select an optimum moving trajectory based on a plurality of wheel position markers of the autonomous vehicle and a plurality of wheel position markers of further autonomous vehicles matched with the detailed map;

receiving virtual lane information based on the selected optimum moving trajectory; and controlling driving of the autonomous vehicle by adjusting a driving position of the autonomous vehicle based the received virtual lane information, when a lane is blurred or removed, a lane is a zigzag lane, or a lane is not clear, so that the autonomous vehicle to be centered of the virtual lane;

wherein transmitting the wheel position marker to the server comprises transmitting all wheel positions of the vehicle based on a wheel position marker included in wheel position information of the autonomous vehicle; and wherein the method further comprises checking one wheel position corresponding to one wheel position marker when one wheel position marker is included in the wheel position information, and calculating a wheel position of each of the remaining wheels based on a distance between one wheel position corresponding to the wheel position marker and the remaining wheels.

15. The method of claim 14, wherein the plurality of wheel position markers of further autonomous vehicles are based on earlier travel on a road on which the autonomous vehicle travels.

16. The method of claim 14, wherein the optimum moving trajectory is selected by analyzing the moving trajectory of each of the autonomous vehicle and the plurality of further autonomous vehicles to calculate an average value and a mode value of the moving trajectory of each autonomous vehicle, and selecting the optimum moving trajectory based on the calculated average value and mode value.

17. The method of claim 14, wherein the optimum moving trajectory is selected by analyzing and learning the moving trajectory of each of the autonomous vehicle and the plurality of further autonomous vehicles to predict a driving route of the autonomous vehicle and select the optimum moving trajectory based on the predicted driving route.

18. A server comprising:

an input configured to receive wheel position markers generated by a plurality of autonomous vehicles including a first autonomous vehicle;

a storage configured to store the wheel position marker received from the first autonomous vehicle;

a processor; and a memory storing computer code that, when executed by the processor, causes the processor to:

match the wheel position marker with a detailed map to generate a moving trajectory of the first autonomous vehicle;

analyze the generated moving trajectory of the first autonomous vehicle to select an optimum moving trajectory; and generate virtual lane information based on the selected optimum moving trajectory, wherein generating the wheel position marker comprises generating one wheel position marker corresponding to one turn for each setting time and matching the wheel position marker with the detailed map and connecting a plurality of wheel position markers matched with the detailed map to generate a moving trajectory of each autonomous vehicle of the plurality of autonomous vehicles; and an output configured to transmit the generated virtual lane information to the first autonomous vehicle so that a driving lane keeping control system of the first autonomous vehicle can correct to be centered of the virtual lane a driving position based the virtual lane information received from the server, when a lane is blurred or removed, a lane is a zigzag lane, or a lane is not clear so that the first autonomous vehicle receives the generated virtual land information and controls a driving position by correcting or maintaining based on the virtual lane information so that the first autonomous vehicle is centered of the virtual lane;

wherein the server is configured to calculate all wheel positions of each autonomous vehicle based on a wheel position marker included in wheel position information of each autonomous vehicle; and wherein the server, when calculating the wheel position of each vehicle, is configured to check a wheel position of a first wheel corresponding to one wheel position marker when one wheel position marker is included in the wheel position information, and to calculate a wheel position of each of remaining wheels based on a distance between the wheel position of the first wheel and the remaining wheels.

19. The server of claim 18, wherein the computer code causes the processor to select the optimum moving trajectory by analyzing the moving trajectory of each autonomous vehicle of the plurality of autonomous vehicles to calculate an average value and a mode value of the moving trajectory of each autonomous vehicle, and selecting the optimum moving trajectory based on the calculated average value and mode value.

20. The server of claim 18, wherein the computer code causes the processor to select the optimum moving trajectory by analyzing and learning the moving trajectory of each autonomous vehicle of the plurality of autonomous vehicles to predict a driving route of each autonomous vehicle and selecting the optimum moving trajectory based on the predicted driving route.

* * * * *